(12) United States Patent
Grant

(10) Patent No.: US 10,578,255 B1
(45) Date of Patent: Mar. 3, 2020

(54) APPARATUS FOR CONVERTING A FLUORESCENT LIGHT ASSEMBLY INTO AN LED LIGHT ASSEMBLY

(71) Applicant: LENZX, LLC, Newberg, OR (US)

(72) Inventor: Dennis Grant, Newberg, OR (US)

(73) Assignee: LENZX, LLC, Newberg, OR (US)

( * ) Notice: Subject to any disclaimer, the term of this patent is extended or adjusted under 35 U.S.C. 154(b) by 0 days.

(21) Appl. No.: 15/424,751

(22) Filed: Feb. 3, 2017

Related U.S. Application Data

(63) Continuation of application No. 14/464,626, filed on Aug. 20, 2014, now Pat. No. 9,574,724.

(60) Provisional application No. 61/867,884, filed on Aug. 20, 2013.

(51) Int. Cl.
F21K 9/272 (2016.01)
F21V 23/00 (2015.01)
F21V 19/00 (2006.01)
F21K 9/275 (2016.01)
F21K 9/278 (2016.01)
F21Y 103/10 (2016.01)
F21Y 115/10 (2016.01)

(52) U.S. Cl.
CPC ............. F21K 9/272 (2016.08); F21K 9/275 (2016.08); F21K 9/278 (2016.08); F21V 19/0035 (2013.01); F21V 23/009 (2013.01); F21Y 2103/10 (2016.08); F21Y 2115/10 (2016.08)

(58) Field of Classification Search
CPC .......... F21K 9/272; F21K 9/275; F21K 9/278; F21V 19/0035; F21V 23/009; F21Y 2103/10; F21Y 2115/10
USPC ...................................... 362/217.01
See application file for complete search history.

(56) References Cited

U.S. PATENT DOCUMENTS

| | | | | |
|---|---|---|---|---|
| 2008/0218998 A1* | 9/2008 | Quest | ...................... | G01M 3/38 362/230 |
| 2012/0155073 A1* | 6/2012 | McCanless | ............... | F21S 8/04 362/218 |
| 2014/0160756 A1* | 6/2014 | Ebner | ...................... | G09F 13/04 362/244 |

* cited by examiner

Primary Examiner — Britt D Hanley
Assistant Examiner — Jessica M Apenteng
(74) Attorney, Agent, or Firm — Innovation Partners; Charles E. Gottlieb

(57) ABSTRACT

A system replaces a lens for a fluorescent lamp with a cap that has LEDs installed in the cap, along with suitable driving circuitry as a replacement light source for the fluorescent lamp and its associated circuitry.

4 Claims, 1 Drawing Sheet

APPARATUS FOR CONVERTING A FLUORESCENT LIGHT ASSEMBLY INTO AN LED LIGHT ASSEMBLY

RELATED APPLICATIONS

This application is a continuation of U.S. patent application Ser. No. 14/464,626 entitled "Method for Converting a Fluorescent Light Assembly Into an LED Light Assembly" filed by Dennis Grant on Aug. 20, 2014 which claims the benefit of U.S. Provisional Patent Application Ser. No. 61/867,884 entitled, "Method and Apparatus for Illuminating a Cleanroom" filed on Aug. 20, 2014 by Dennis Grant and each is hereby incorporated by reference in its entirety.

FIELD OF THE INVENTION

The present invention is related to lighting and more specifically to clean room lighting.

BACKGROUND OF THE INVENTION

Conventional clean rooms, such as those used to manufacture semiconductors are lit with fluorescent lamps that are installed into housings. This is suboptimal. What is needed is a new way to light semiconductor or other clean rooms.

SUMMARY OF INVENTION

A system and method replaces a plastic lens in the existing fluorescent lamp fixture with an opaque cap having holes into each of which a cap LED is mounted. The electronic ballast, reflector, the fluorescent lamp, and the fittings into which the fluorescent lamp is installed may be removed from the fixture, and replaced with an AC to DC converter. The replacement may be performed in the clean room, and the resulting light fixture is used to illuminate the clean room.

DETAILED DESCRIPTION OF A PREFERRED EMBODIMENT

Figure 1:
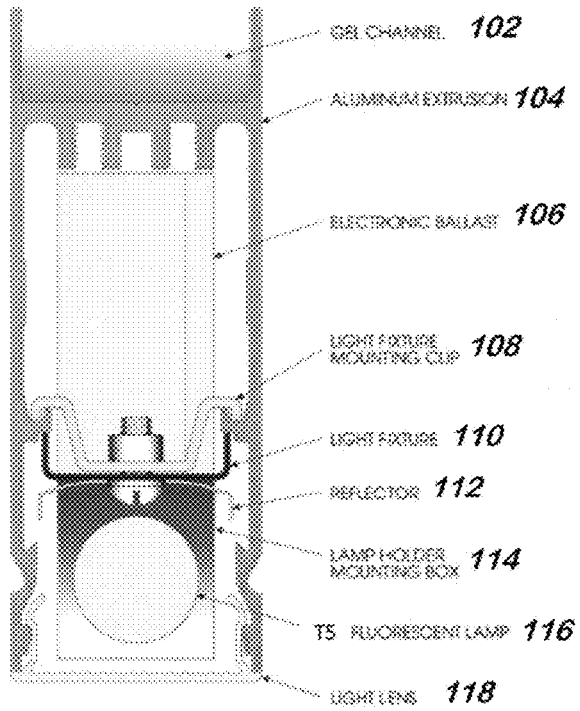
FIG. 1 is a cross section drawing of a conventional light assembly.

Referring now to FIG. 1, a cross section of a prior art light assembly is shown according to one embodiment of the present invention. In one embodiment, the prior art light assembly also is used to support filters the filter air flowing into the clean room. A support structure for the filters is inserted into a gel channel 102, which supports the filters and prevents air from flowing around the filters. The assembly includes an aluminum extrusion 104, also referred to as a housing, that serves to hold an electronic ballast 106 used to supply power to a fluorescent lamp 116. A mounting clip 108 supports the electronic ballast 106, and the fluorescent lamp 116 to the aluminum extrusion 104. The mounting clip 108 may also hold a reflector 112 which is used to reflect the upward beam of light back down to the clean room 120. A light lens 118 may be made of plastic, which may be clear or semi opaque and allows the light from the fluorescent lamp 116, some of which may be reflected by the reflector 112, to shine into the clean room 120.

Figure 2:
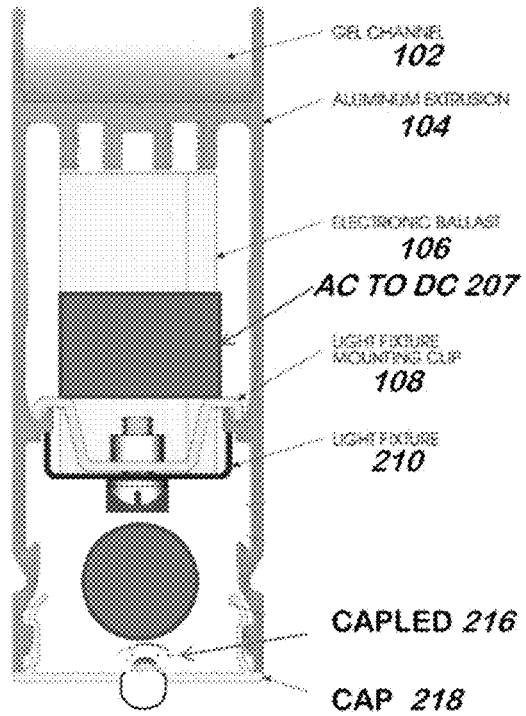
FIG. 2 is a cross section drawing of light assembly according to the present invention.

A cross section of the light assembly according to the present invention is shown in FIG. 2. Referring now to FIG. 2, the light assembly is shown and contains the gel channel 102, the aluminum extrusion 104, and optionally the light fixture mounting clip 108. Electronic ballast 106 may be left in place or removed. The reflector 112 may also be removed. The fluorescent lamp 116 is also removed.

The light lens 118 is replaced in FIG. 2 with a cap 218, also referred to as a panel, which may be opaque, clear, or semi opaque, and may be made of metal, plastic, or any other material. The cap 218 has a shape (including size) similar or identical to the light lens, including the shape of a portion of the lens 118 that attaches the lens to the aluminum extrusion 104, except that holes are drilled into, or otherwise provided in, the cap 218, into which multiple CapLED's are inserted along the length of the assembly. CapLEDs are available from NEPES Corp. of Seoul, Korea. The light from the CapLED radiates in a semispherical direction about the bottom of the CapLED 216. An AC to DC converter 207 supplies power to the CapLEDs 216.

Figure 3:
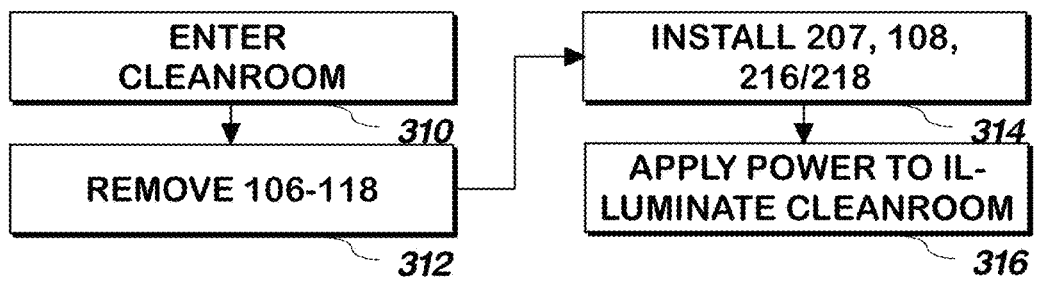
FIG. 3 is a flowchart illustrating a method of retrofitting a prior art light assembly to convert it to an LED light assembly according to one embodiment of the present invention.

Referring now to FIG. 3 a method of retrofitting a fluorescent lamp assembly is shown according to one embodiment of the present invention. The clean room is entered 310 by workmen, who removes 312 any or all of the electronic ballast 106, the light fixture mounting clip 108, the light fixture 110, the reflector 112, the lamp holder mounting box 114, the fluorescent lamp 116, and the light lens 118. The workmen installs the AC to DC converter 207, reinstalls the light fixture mounting clip 108, optionally installs the light fixture 210, which may be the same as light fixture 110, or may be adapted to support the AC to DC converter 207, and installs an assembly consisting of the opaque cap 218 containing one or more CapLEDs 216. The AC to DC converter 207 is coupled by the workman to AC power that had been supplying power to the electronic ballast 106, and supplies DC power to the CapLEDs 216, to which it is coupled by the workman 314. Power is applied which illuminates the clean room via the CapLEDs 316. Any number of workmen may be used to perform the method.

There is described a method of converting a fluorescent light assembly to an LED light assembly, including: removing from a housing a lens of the fluorescent light assembly through which fluorescent light from the fluorescent light assembly had shined, the lens being held to the fluorescent light assembly by a fluorescent lens holding mechanism of the housing; removing a fluorescent lamp from above the lens; adding an AC to DC converter to an electrical circuit that had supplied power to a fluorescent light ballast of the fluorescent light assembly; coupling the AC to DC converter to a plurality of LEDs attached or to be attached to a panel; and installing the panel used to hold the plurality of LEDs, to the fluorescent light assembly to the housing, using the fluorescent lens holding mechanism, thereby converting the fluorescent light assembly into an LED light assembly.

The method includes an optional step of removing the fluorescent light ballast from a space within the housing after removing the lens and before installing the panel. The method includes an optional feature, whereby the AC to DC converter is added at least in part to at least part of the space, after the fluorescent light ballast is removed.

The method includes an optional feature whereby the housing is installed in a cleanroom.

The method includes an optional feature whereby the housing comprises at least a part of a holder for a filter.

The method includes an optional feature whereby a shape of the panel is at least similar to a shape to the lens.

The method includes an optional feature whereby the shape of panel that is at least similar to the shape of the lens comprises a portion of the lens used to couple the lens to the housing.

The method additionally optionally includes the additional step of removing a reflector above the fluorescent lamp.

What is claimed is:

1. A panel comprising:
 a cap shaped so that, when the panel replaces a lens through which light generated internal to a fluorescent light assembly had passed, the cap is held to the fluorescent light assembly by a holding mechanism that previously held the lens to the fluorescent light assembly; and
 a plurality of LEDs mounted to the cap to be at least partially exposed externally from the fluorescent light assembly and cap through a plurality of holes in the cap when the cap is held to the fluorescent light assembly using the holding mechanism, in place of the lens.

2. The panel of claim 1, wherein light from each of the plurality of LEDs radiates in a semispherical direction about a bottom of said LED.

3. The panel of claim 1, wherein the plurality of LEDs are powered by an AC to DC converter placed within the fluorescent light assembly.

4. The panel of claim 1, wherein a first portion of the cap that is held to the fluorescent light assembly and a second portion of the cap to which the plurality of LEDs are mounted is a single piece of material.

* * * * *